(12) United States Patent
Surnilla et al.

(10) Patent No.: US 9,382,858 B1
(45) Date of Patent: Jul. 5, 2016

(54) METHODS AND SYSTEMS FOR AN OXYGEN SENSOR

(71) Applicant: Ford Global Technologies, LLC, Dearborn, MI (US)

(72) Inventors: Gopichandra Surnilla, West Bloomfield, MI (US); Timothy Joseph Clark, Livonia, MI (US); Richard E. Soltis, Saline, MI (US); Jacobus Hendrik Visser, Farmington Hills, MI (US); Christopher House, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/056,745

(22) Filed: Feb. 29, 2016

Related U.S. Application Data

(63) Continuation of application No. 14/052,641, filed on Oct. 11, 2013, now Pat. No. 9,273,621.

(51) Int. Cl.
| | |
|---|---|
| F02D 23/00 | (2006.01) |
| F02B 33/44 | (2006.01) |
| F01N 3/02 | (2006.01) |
| F02D 41/00 | (2006.01) |
| F02D 41/08 | (2006.01) |
| F02M 25/08 | (2006.01) |
| F02D 41/02 | (2006.01) |
| F02D 41/24 | (2006.01) |
| F02D 41/14 | (2006.01) |
| F02M 35/10 | (2006.01) |
| F02B 37/007 | (2006.01) |
| F02B 29/04 | (2006.01) |
| F02B 37/18 | (2006.01) |

(Continued)

(52) U.S. Cl.
CPC .......... *F02D 41/005* (2013.01); *F02D 41/0072* (2013.01); *F02D 41/0235* (2013.01); *F02D 41/08* (2013.01); *F02D 41/144* (2013.01); *F02D 41/2474* (2013.01); *F02M 25/089* (2013.01); *F02M 26/42* (2016.02); *F02M 26/49* (2016.02); *F02M 35/10222* (2013.01); *F02M 35/10393* (2013.01); *F02B 29/0406* (2013.01); *F02B 37/001* (2013.01); *F02B 37/007* (2013.01); *F02B 37/18* (2013.01); *F02D 41/123* (2013.01); *F02D 2200/0418* (2013.01); *Y02T 10/47* (2013.01)

(58) Field of Classification Search
CPC ... F02D 41/005; F02D 41/0235; F02D 43/04; F02B 29/0468; F02B 29/04; Y02T 10/144
USPC .............. 60/277, 602, 605.1, 605.2; 123/563; 701/102, 103, 112
See application file for complete search history.

(56) References Cited

U.S. PATENT DOCUMENTS

| | | | | |
|---|---|---|---|---|
| 6,223,735 | B1 * | 5/2001 | Poggio | G01N 27/4175 123/694 |
| 6,742,379 | B2 * | 6/2004 | Matsubara | F02D 41/144 73/1.06 |

(Continued)

*Primary Examiner* — Audrey K Bradley
*Assistant Examiner* — Dapinder Singh
(74) *Attorney, Agent, or Firm* — Julia Voutyras; Alleman Hall McCoy Russell & Tuttle LLP

(57) ABSTRACT

Methods and systems are provided for accurately learning the zero point of an intake gas oxygen sensor in varying ambient humidity conditions. The learned zero point is corrected based on an estimated ambient humidity to calibrate the reading for dry air conditions or standard humidity conditions. EGR control is performed by comparing the output of an intake oxygen sensor during EGR conditions relative to the humidity-corrected zero point.

20 Claims, 8 Drawing Sheets

(51) Int. Cl.
*F02B 37/00* (2006.01)
*F02D 41/12* (2006.01)

(56) References Cited

U.S. PATENT DOCUMENTS

| | | | |
|---|---|---|---|
| 8,417,413 | B2 | 4/2013 | Ishiguro et al. |
| 9,163,575 | B2 | 10/2015 | Pursifull |
| 9,181,887 | B2 | 11/2015 | Surnilla et al. |
| 2011/0073086 | A1 | 3/2011 | Bahlo et al. |
| 2011/0132340 | A1* | 6/2011 | Soltis .................. F02D 41/0025 123/703 |
| 2013/0024091 | A1* | 1/2013 | Yun ..................... F02D 41/0057 701/103 |
| 2014/0150760 | A1 | 6/2014 | Surnilla et al. |
| 2015/0101327 | A1 | 4/2015 | Clark et al. |

\* cited by examiner

METHODS AND SYSTEMS FOR AN OXYGEN SENSOR

CROSS REFERENCE TO RELATED APPLICATIONS

The present application is a continuation of U.S. patent application Ser. No. 14/052,641, entitled "METHODS AND SYSTEMS FOR AN OXYGEN SENSOR," filed on Oct. 11, 2013, the entire contents of which are hereby incorporated by reference for all purposes.

TECHNICAL FIELD

The present application relates generally to a gas constituent sensor included in an intake system of an internal combustion engine.

BACKGROUND AND SUMMARY

Engine systems may utilize recirculation of exhaust gas from an engine exhaust system to an engine intake system (intake passage), a process referred to as exhaust gas recirculation (EGR), to reduce regulated emissions. An EGR system may include various sensors to measure and/or control the EGR. As one example, the EGR system may include an intake gas constituent sensor, such as an oxygen sensor, which may be employed to measure oxygen to determine the proportion of combusted gases in an intake passage of the engine. The sensor may also be used during non-EGR conditions to determine the oxygen content of fresh intake air. The EGR system may additionally or optionally include an exhaust gas oxygen sensor coupled to the exhaust manifold for estimating a combustion air-fuel ratio.

As such, when the intake oxygen sensor is used for EGR control, the EGR is measured as a function of the change in oxygen due to EGR as a diluent. To determine the change in the amount of oxygen, a reference point corresponding to an oxygen reading when no EGR is present is required. Such a reference point is called the "zero point" of the oxygen sensor. Due to the sensitivity of the oxygen sensor to various conditions, such as pressure, aging, and piece-to-piece variability, there may be large deviations in the "zero point" at different engine operating conditions. Therefore the oxygen sensor may need to be regularly calibrated and a correction factor may need to be learned.

One example method for calibrating an exhaust gas oxygen sensor is depicted by Ishiguro et al. in U.S. Pat. No. 8,417,413. Therein, a correction factor is learned based on an oxygen sensor output during engine fuel-cut off conditions. However, the inventors have recognized that approaches used for zero point estimation in exhaust oxygen sensors may not be applied for zero point estimation of intake oxygen sensors. This is because in addition to being sensitive to pressure and part-to-part variability, due to equilibration of the sensed gas by a catalyzing sensing element of the sensor, the intake oxygen sensor is also sensitive to ambient humidity. Specifically, the water content of the intake aircharge may displace oxygen. If the reading is used to estimate EGR, more diluent may be estimated as the humidity increases. As a result, the measurement and/or control of EGR may be reduced.

In one example, some of the above issues may be addressed by a method for an engine comprising: estimating an ambient humidity while learning a reference point for an intake oxygen sensor at a reference intake pressure; and correcting the learned reference point based on the estimated ambient humidity. In this way, a zero point reading for an intake oxygen sensor may be corrected for the effect of varying ambient humidity, improving the accuracy of EGR control.

For example, at the first engine idle following every engine start, an idle adaptation of the intake oxygen sensor may be performed. Therein, an output of the intake oxygen sensor may be monitored, while also estimating a reference intake pressure (based on an intake manifold pressure sensor output) and an ambient humidity (based on an intake manifold humidity sensor output). The output of the intake oxygen sensor is corrected based on the estimated ambient humidity to learn a dry air nominal oxygen sensor reading. Alternatively, the output of the intake oxygen sensor is corrected based on the estimated ambient humidity to learn an oxygen sensor reading for a calibrated amount of humidity (e.g., for a pre-defined standard humidity level). A relationship between the corrected output of the intake oxygen sensor at the reference intake pressure may then be learned as the reference "zero point". During subsequent engine non-idling conditions, a difference between an output of the intake oxygen sensor and the learned zero point may be used to estimate an EGR concentration, and thereby adjust an EGR flow.

In this way, the effect of humidity on the output an intake oxygen sensor can be compensated for. By measuring the ambient humidity at the time of learning the reference point of the intake oxygen sensor, the amount of oxygen displaced by the ambient humidity can be learned and used to correct the sensor output. By calibrating the sensor output to a dry air condition, where the effect of all humidity is removed, or to a standard air condition, where the effect of a standard humidity level is learned, the sensor output can be regulated to pre-defined conditions. By using the humidity-corrected zero point to estimate EGR flow, EGR calculation errors from variations in ambient humidity conditions can be reduced. Overall, the accuracy of EGR estimation is increased, allowing for improved EGR control.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
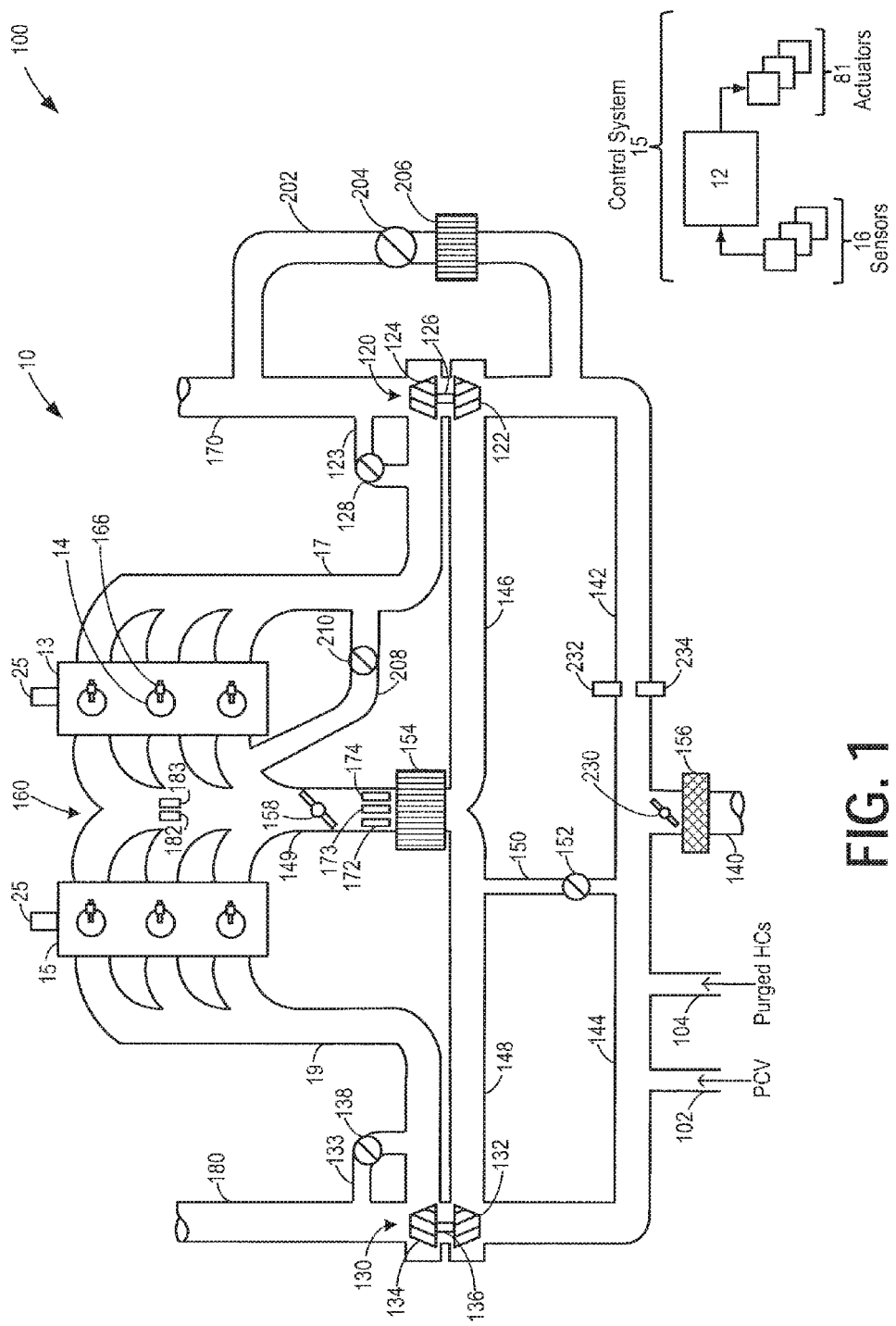
FIGS. 1 and 2 are schematic diagrams of an engine system.
Figure 2:
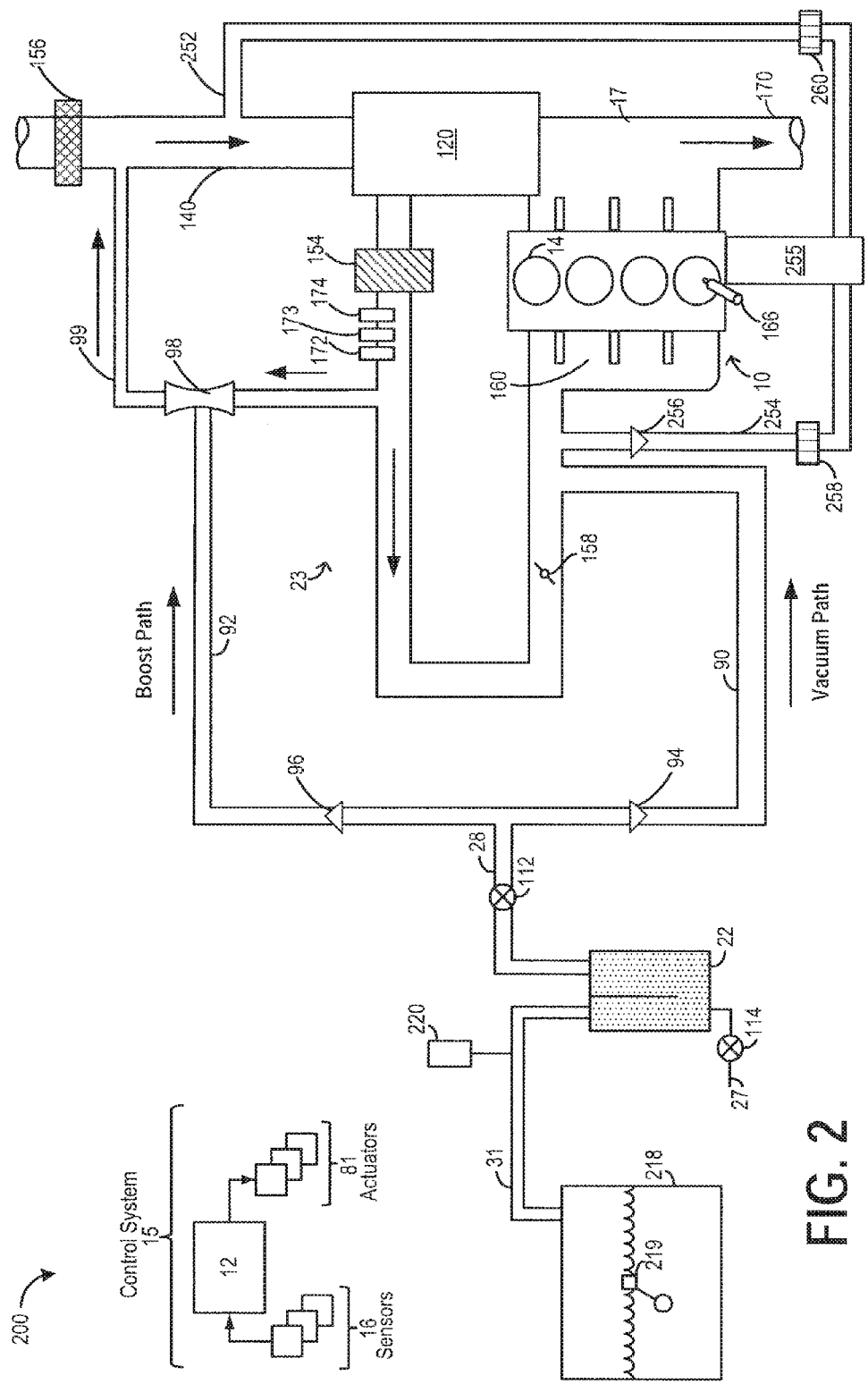
Figure 3:
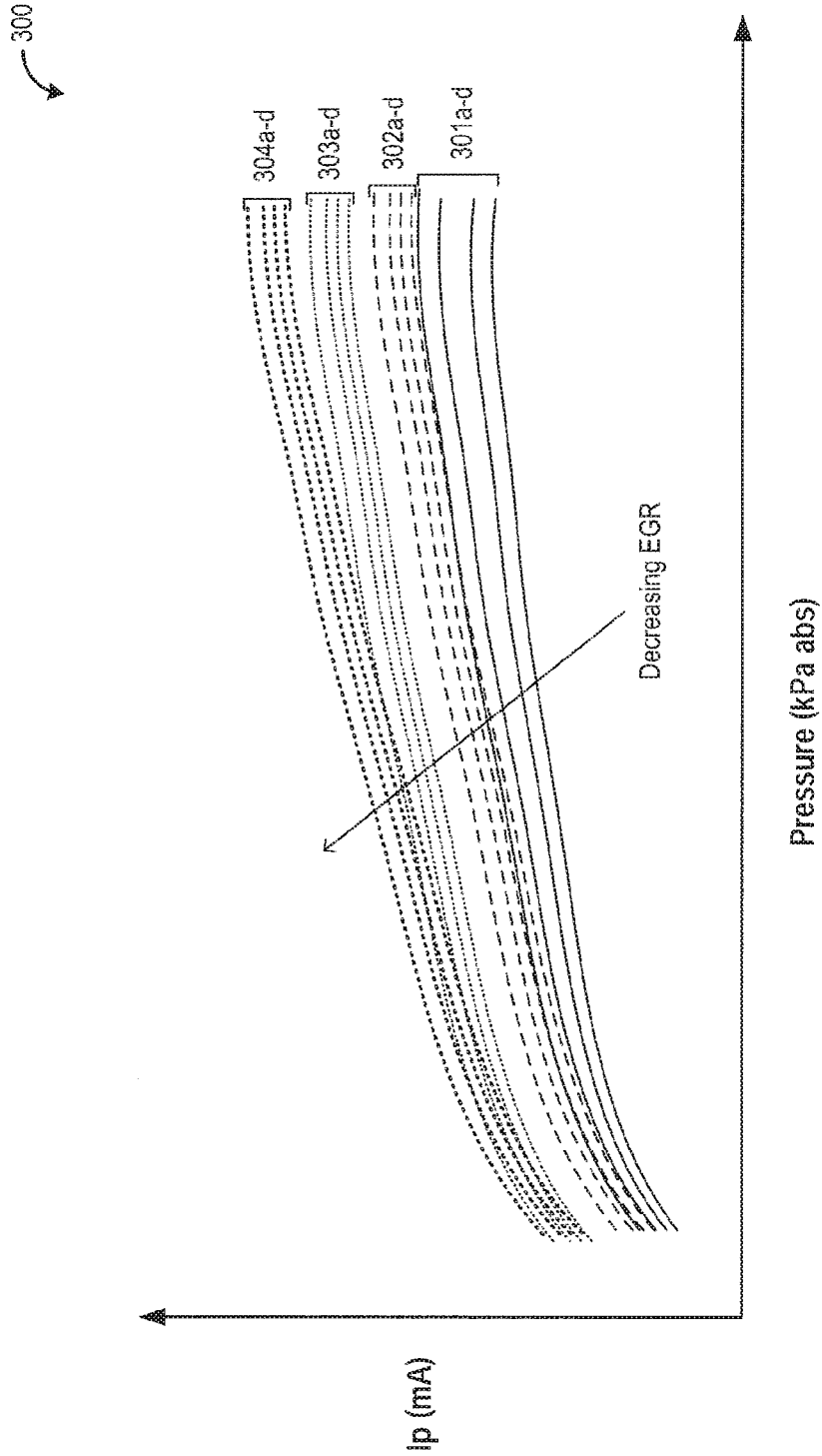
FIG. 3 is a map depicting the relationship between intake pressure and the pumping current of an intake oxygen sensor.
Figure 7:
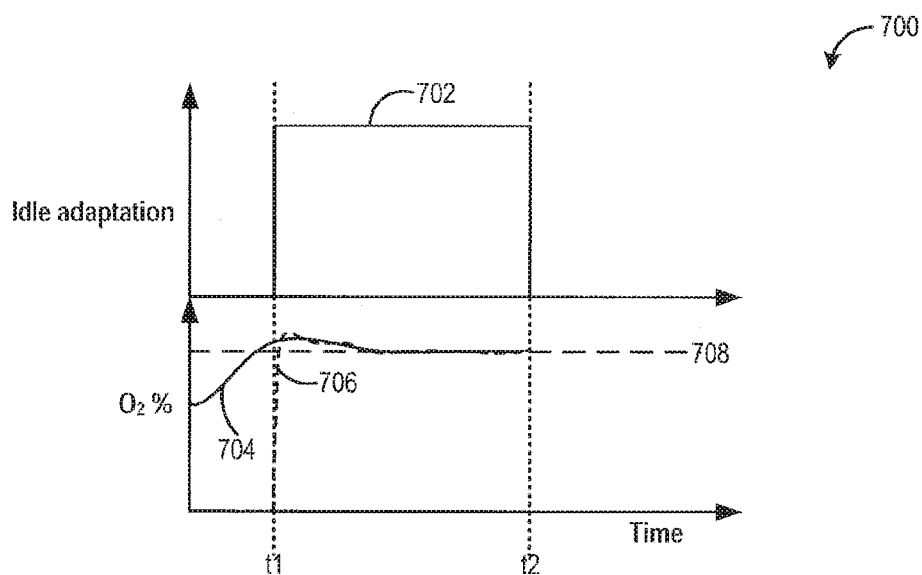
FIG. 7 shows an example idle adaptation.
Figure 8:
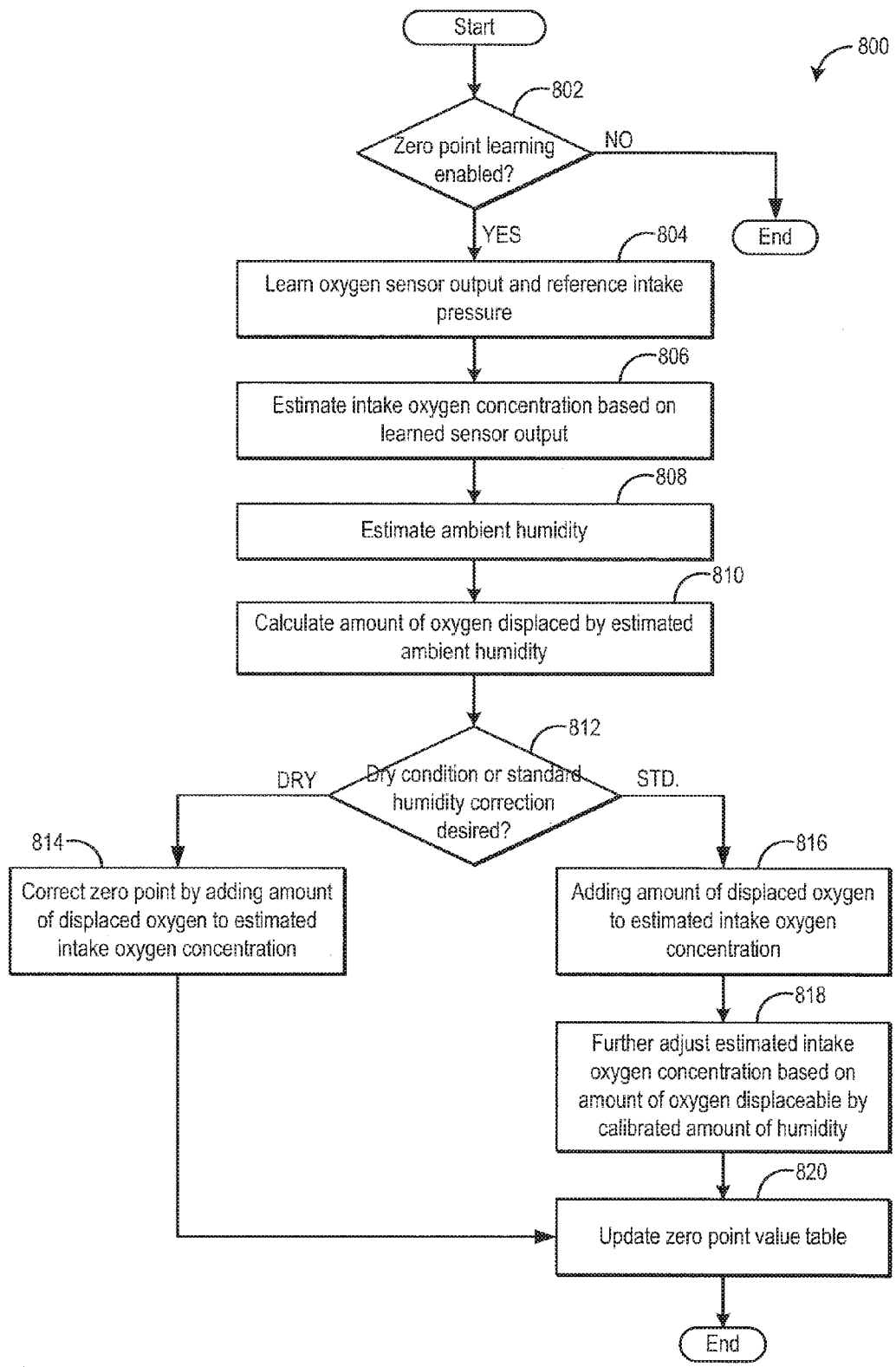
FIG. 8 depicts a flowchart for correcting a learned zero point based on ambient humidity.

The present description is related to methods and system for learning a reference point, or zero point, for an intake oxygen sensor, such as the sensor coupled to the engine systems of FIGS. 1-2. The reference point may be determined based on a learned relationship between the output of the intake oxygen sensor and an output of an intake pressure sensor at selected conditions (FIG. 3). A controller may be configured to perform a control routine, such as the routine of FIGS. 4-5 to learn the zero point for the intake oxygen sensor during an idle adaptation or during a DFSO adaptation. The learned reference point may be corrected based on ambient humidity (FIG. 8). The controller may also be configured to perform a routine (FIG. 6) to identify EGR valve leakage based on discrepancies between the zero point estimated at idle conditions and the zero point estimated at DFSO conditions. In response to EGR valve leakage, EGR control may be adjusted (FIG. 9) so as to vary the feedback component of EGR control from the oxygen sensor. An example idle adaptation is shown at FIG. 7. In this way, an intake oxygen sensor reading may be corrected for aging, part-to-part variations, and effects from fuel and reductants.

FIG. 1 shows a schematic depiction of an example turbocharged engine system 100 including a multi-cylinder internal combustion engine 10 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156 and an EGR throttle valve 230. Engine system 100 may be a split-engine system wherein intake passage 140 is branched downstream of EGR throttle valve 230 into first and second parallel intake passages, each including a turbocharger compressor. Specifically, at least a portion of intake air is directed to compressor 122 of turbocharger 120 via a first parallel intake passage 142 and at least another portion of the intake air is directed to compressor 132 of turbocharger 130 via a second parallel intake passage 144 of the intake passage 140.

The first portion of the total intake air that is compressed by compressor 122 may be supplied to intake manifold 160 via first parallel branched intake passage 146. In this way, intake passages 142 and 146 form a first parallel branch of the engine's air intake system. Similarly, a second portion of the total intake air can be compressed via compressor 132 where it may be supplied to intake manifold 160 via second parallel branched intake passage 148. Thus, intake passages 144 and 148 form a second parallel branch of the engine's air intake system. As shown in FIG. 1, intake air from intake passages 146 and 148 can be recombined via a common intake passage 149 before reaching intake manifold 160, where the intake air may be provided to the engine.

A first EGR throttle valve 230 may be positioned in the engine intake upstream of the first and second parallel intake passages 142 and 144, while a second air intake throttle valve 158 may be positioned in the engine intake downstream of the first and second parallel intake passages 142 and 144, and downstream of the first and second parallel branched intake passages 146 and 148, for example, in common intake passage 149.

In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. Intake passage 149 can include a charge air cooler (CAC) 154 and/or a throttle (such as second throttle valve 158). The position of throttle valve 158 can be adjusted by the control system via a throttle actuator (not shown) communicatively coupled to controller 12. An anti-surge valve 152 may be provided to selectively bypass the compressor stages of turbochargers 120 and 130 via bypass passage 150. As one example, anti-surge valve 152 can open to enable flow through bypass passage 150 when the intake air pressure downstream of the compressors attains a threshold value.

Intake manifold 160 may further include an intake gas oxygen sensor 172. In one example, the oxygen sensor is a UEGO sensor. As elaborated herein, the intake gas oxygen sensor may be configured to provide an estimate regarding the oxygen content of fresh air received in the intake manifold. In addition, when EGR is flowing, a change in oxygen concentration at the sensor may be used to infer an EGR amount and used for accurate EGR flow control. In the depicted example, oxygen sensor 162 is positioned upstream of throttle 158 and downstream of charge air cooler 154. However, in alternate embodiments, the oxygen sensor may be positioned upstream of the CAC.

A pressure sensor 174 may be positioned alongside the oxygen sensor for estimating an intake pressure at which an output of the oxygen sensor is received. Since the output of the oxygen sensor is influenced by the intake pressure, a reference oxygen sensor output may be learned at a reference intake pressure. In one example, the reference intake pressure is a throttle inlet pressure (TIP) where pressure sensor 174 is a TIP sensor. In alternate examples, the reference intake pressure is a manifold pressure (MAP) as sensed by MAP sensor 182.

A humidity sensor 173 may be positioned alongside the intake oxygen sensor and the intake pressure sensor. Specifically, as depicted, each of the humidity sensor 173, intake oxygen sensor 172, and intake pressure sensor 174 are positioned upstream of intake throttle 158 and downstream of charge air cooler 154 in the engine intake manifold. The humidity sensor may be configured to provide an estimate of the ambient humidity. As elaborated with reference to FIG. 8, a controller may estimate an ambient humidity while learning a reference point for the intake oxygen sensor at a reference intake pressure and correct the learned reference point based on the estimated ambient humidity. This allows variations in oxygen sensor output due to variations in ambient humidity to be learned and used for accurately estimating EGR.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 3, 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted from via bank-specific parallel exhaust passages. In the depicted example, a first bank 13 of cylinders of engine 10 can exhaust products of combustion via a first parallel exhaust passage 17 and a second bank 15 of cylinders can exhaust products of combustion via a second parallel exhaust passage 19. Each of the first and second parallel exhaust passages 17 and 19 may further include a turbocharger turbine. Specifically, products of combustion that are exhausted via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. Similarly, products of combustion that are exhausted via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gas flowing through exhaust passage 19 can bypass turbine 134 via turbine bypass passage 133 as controlled by wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators. Exhaust gases in first parallel exhaust passage 17 may be directed to the atmosphere via branched parallel exhaust passage 170 while exhaust gases in second parallel exhaust passage 19 may be directed to the atmosphere via branched parallel exhaust passage 180. Exhaust passages 170 and 180 may include one or more exhaust after-treatment devices, such as a catalyst, and one or more exhaust gas sensors.

Engine 10 may further include one or more exhaust gas recirculation (EGR) passages, or loops, for recirculating at least a portion of exhaust gas from the exhaust manifold to the intake manifold. These may include high-pressure EGR loops for proving high-pressure EGR (HP-EGR) and low-pressure EGR-loops for providing low-pressure EGR (LP-EGR). In one example, HP-EGR may be provided in the absence of boost provided by turbochargers 120, 130, while LP-EGR may be provided in the presence of turbocharger boost and/or when exhaust gas temperature is above a threshold. In still other examples, both HP-EGR and LP-EGR may be provided simultaneously.

In the depicted example, engine 10 may include a low-pressure EGR loop 202 for recirculating at least some exhaust gas from the first branched parallel exhaust passage 170, downstream of the turbine 124, to the first parallel intake passage 142, upstream of the compressor 122. In some embodiments, a second low-pressure EGR loop (not shown) may be likewise provided for recirculating at least some exhaust gas from the second branched parallel exhaust passage 180, downstream of the turbine 134, to the second parallel intake passage 144, upstream of the compressor 132. LP-EGR loop 202 may include LP-EGR valve 204 for controlling an EGR flow (i.e., an amount of exhaust gas recirculated) through the loops, as well as an EGR cooler 206 for lowering a temperature of exhaust gas flowing through the EGR loop before recirculation into the engine intake. The LP-EGR valve 204 can be positioned upstream or downstream of the LP EGR cooler 206. Under certain conditions, the EGR cooler 206 may also be used to heat the exhaust gas flowing through LP-EGR loop 202 before the exhaust gas enters the compressor to avoid water droplets impinging on the compressors.

Engine 10 may further include a first high-pressure EGR loop 208 for recirculating at least some exhaust gas from the first parallel exhaust passage 17, upstream of the turbine 124, to the intake manifold 160 downstream of the engine throttle 158. Likewise, the engine may include a second high-pressure EGR loop (not shown) for recirculating at least some exhaust gas from the second parallel exhaust passage 19, upstream of the turbine 134, to the intake manifold 160 downstream of the engine throttle 158. EGR flow through HP-EGR loops 208 may be controlled via HP-EGR valve 210. If two HP-EGR loops are present coupled to each branch of the air induction system, they may each utilize their own HP-EGR valves 210 or join together prior to and share the same HP-EGR valve before introduction into the intake manifold. It will be appreciated that as an alternate to the above described single and dual HP-EGR loop configurations, HP-EGR may be introduced into intake passages 146 and/or 148 instead of into intake manifold 160.

A PCV port 102 may be configured to deliver crankcase ventilation gases (blow-by gases) to the engine intake manifold along second parallel intake passage 144. In some embodiments, flow of PCV air through PCV port 102 may be controlled by a dedicated PCV port valve. Likewise, a purge port 104 may be configured to deliver purge gases from a fuel system canister to the engine intake manifold along passage 144. In some embodiments, flow of purge air through purge port 104 may be controlled by a dedicated purge port valve. As elaborated with reference to FIG. 2, the PCV and purge ports in the pre-compressor air induction tube only flow into the induction tube during boosted conditions. In non-boosted conditions, purge and PCV air are supplied directly to the intake manifold. In other words, during boosted conditions, the purge and PCV gases are received upstream of intake oxygen sensor 172, and therefore affect the output of the sensor during boosted conditions. In comparison, during non-boosted conditions, the purge and PCV gases are received downstream of intake oxygen sensor 172, and therefore do not affect the output of the sensor during non-boosted conditions.

Humidity sensor 232 and pressure sensor 234 may be included in only one of the parallel intake passages (herein, depicted in the first parallel intake air passage 142 but not in the second parallel intake passage 144), downstream of EGR throttle valve 230. Specifically, the humidity sensor and the pressure sensor may be included in the intake passage not receiving the PCV or purge air. Humidity sensor 232 may be configured to estimate a relative humidity of the intake air. In one embodiment, humidity sensor 232 is a UEGO sensor configured to estimate the relative humidity of the intake air based on the output of the sensor at one or more voltages. Since purge air and PCV air can confound the results of the humidity sensor, the purge port and PCV port are positioned in a distinct intake passage from the humidity sensor. Pressure sensor 234 may be configured to estimate a pressure of the intake air. In some embodiments, a temperature sensor may also be included in the same parallel intake passage, downstream of the EGR throttle valve 230.

As such, intake oxygen sensor 172 may be used for estimating an intake oxygen concentration and inferring an amount of EGR flow through the engine based on a change in the intake oxygen concentration upon opening of the EGR valve 204. Specifically, a change in the output of the sensor upon opening the EGR valve is compared to a reference point where the sensor is operating with no EGR (the zero point). Based on the change (e.g., decrease) in oxygen amount from the time of operating with no EGR, an EGR flow currently provided to the engine can be calculated. Then, based on a deviation of the estimated EGR flow from the expected (or target) EGR flow, further EGR control may be performed. As elaborated with reference to FIG. 9, a controller may feedforward adjust the opening of the EGR valve based on engine speed-load conditions while feedback adjusting the EGR valve based on an EGR flow estimated by the oxygen sensor. However, EGR estimation and EGR control requires accurate estimation of the zero point. Since the output of the oxygen sensor is impacted by changes in intake pressure, changes in exhaust air-fuel ratio, part-to-part variations, and reductants (such as those from PCV and purge gases), accurate zero point estimation can be complicated. Without accurate zero point estimation, however, EGR flow control may be not be reliably performed.

Figure 4:
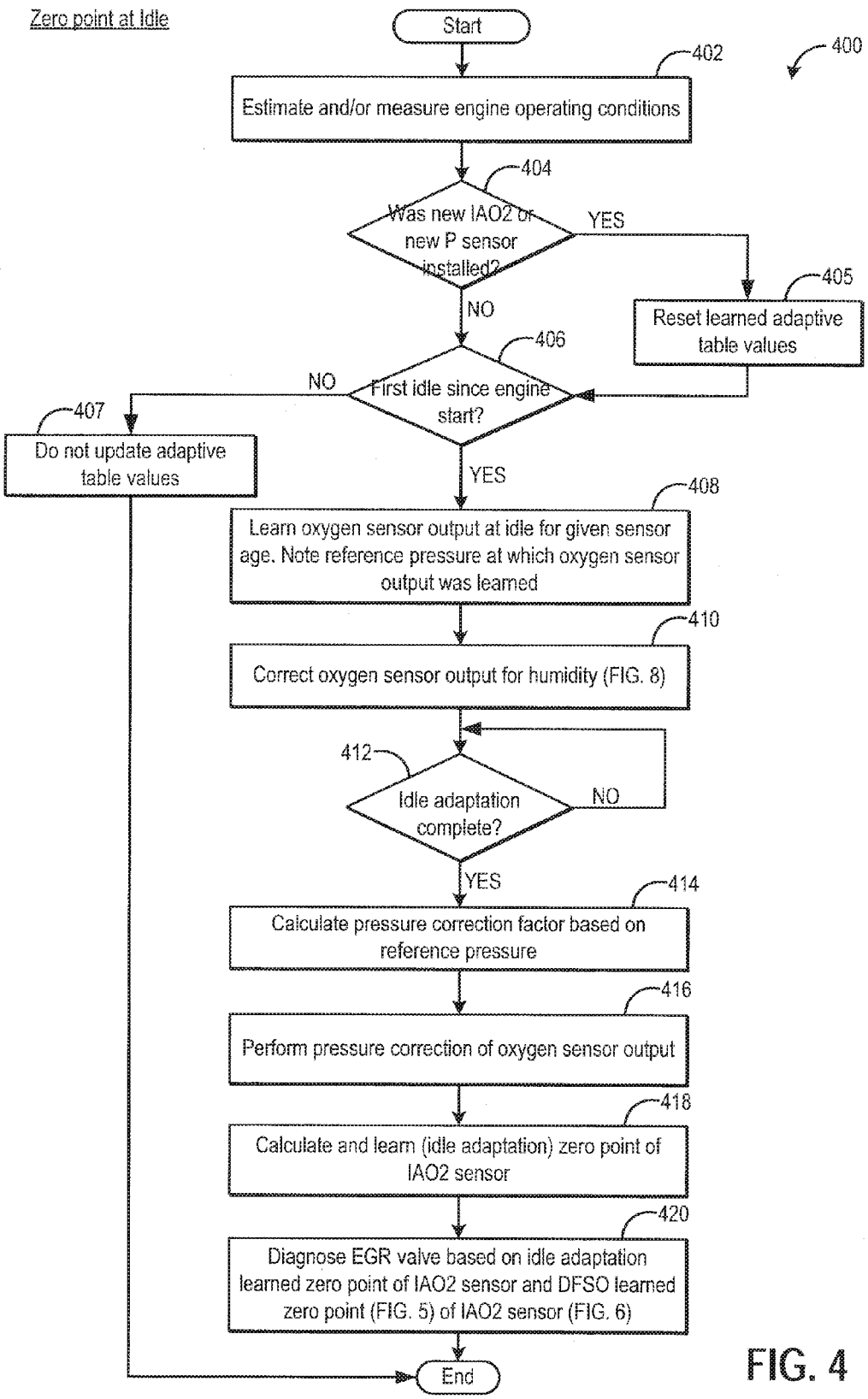
FIG. 4 depicts a flowchart for performing a zero point estimation for an intake oxygen sensor during engine idling conditions.

To overcome these issues, a zero point estimation of the intake oxygen sensor is performed during idle conditions, herein also referred to as an idle adaptation, and discussed at FIG. 4. By performing the adaptation during idling conditions, where intake pressure fluctuations are minimal and when no PCV or purge air is ingested into the low pressure air induction system upstream of the compressor, sensor reading variations due to those noise factors is reduced. As such, purge and PCV air may flow into the engine during idle via the intake manifold. However, they will not affect the intake oxygen sensor output since they are ingested downstream of the sensor, directly into the intake manifold. By also performing the idle adaptation periodically, such as at every first idle following an engine start, the effect of sensor aging and part-to-part variability on the sensor output is also corrected for. Overall a more accurate zero point can be learned.

Figure 5:
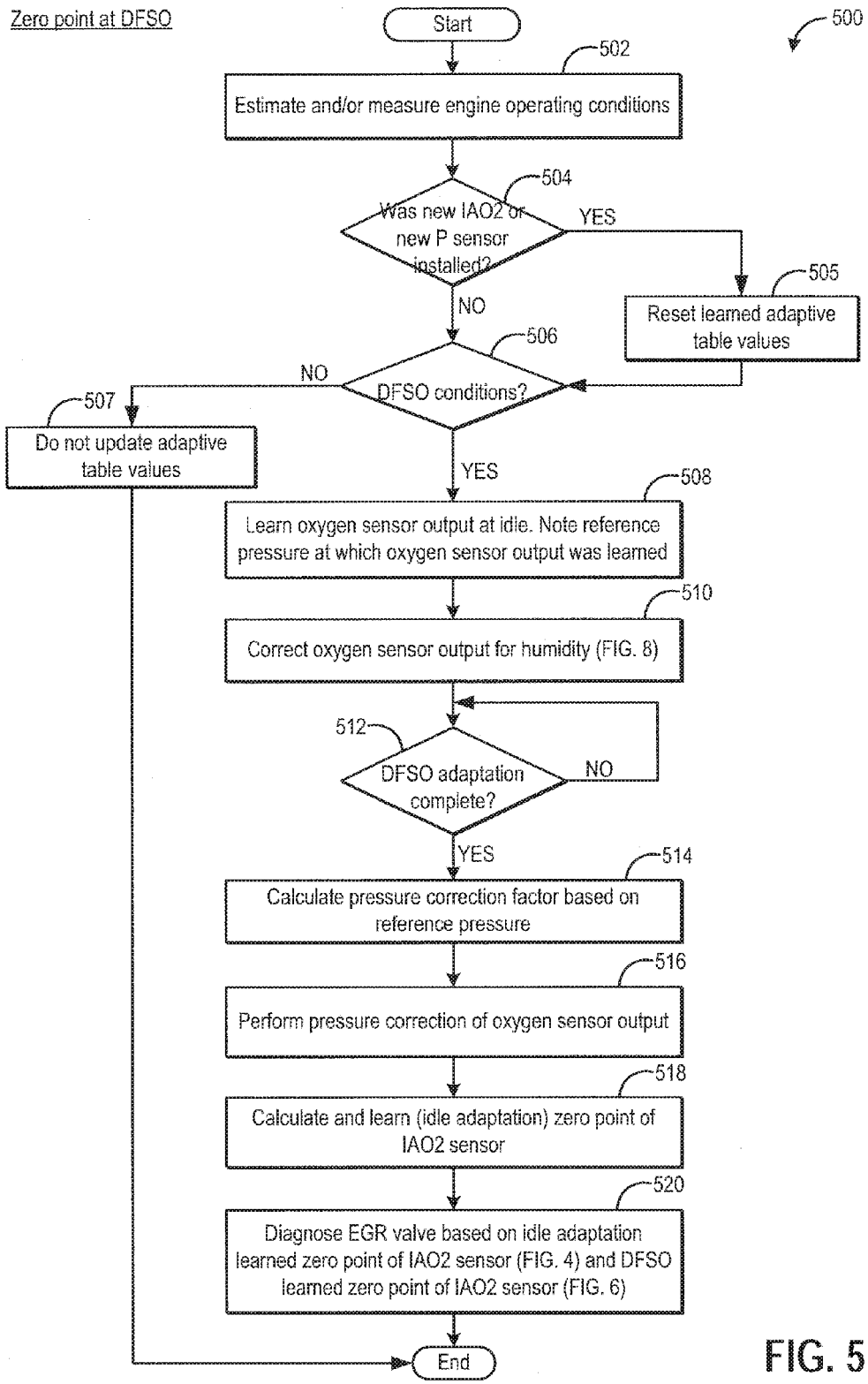
FIG. 5 depicts a flowchart for performing a zero point estimation for an intake oxygen sensor during engine non-fueling conditions.

A zero point estimation of the intake oxygen sensor is also performed during engine non-fueling conditions, such as during a deceleration fuel shut off (DFSO), herein also referred to as a DFSO adaptation, and discussed at FIG. 5. By performing the adaptation during DFSO conditions, in addition to reduced noise factors such as those achieved during idle adaptation, sensor reading variations due to EGR valve leakage is also reduced.

Returning to FIG. 1, the position of intake and exhaust valves of each cylinder 14 may be regulated via hydraulically actuated lifters coupled to valve pushrods, or via direct acting mechanical buckets in which cam lobes are used. In this example, at least the intake valves of each cylinder 14 may be controlled by cam actuation using a cam actuation system. Specifically, the valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Engine system 100 may be controlled at least partially by a control system 15 including controller 12 and by input from a vehicle operator via an input device (not shown). Control system 15 is shown receiving information from a plurality of sensors 16 (various examples of which are described herein) and sending control signals to a plurality of actuators 81. As one example, sensors 16 may include humidity sensor 232, intake air pressure sensor 234, MAP sensor 182, MCT sensor 183, TIP sensor 174, and intake air oxygen sensor 172. In some examples, common intake passage 149 may further include a throttle inlet temperature sensor for estimating a throttle air temperature (TCT). In other examples, one or more of the EGR passages may include pressure, temperature, and air-to-fuel ratio sensors, for determining EGR flow characteristics. As another example, actuators 81 may include fuel injector 166, HP-EGR valve 210, LP-EGR valve 204, throttle valves 158 and 230, and wastegates 128, 138. Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIGS. 4-6 and 8.

Now turning to FIG. 2, another example embodiment 200 of the engine of FIG. 1 is shown. As such, components previously introduced in FIG. 1 are numbered similarly and not re-introduced here for reasons of brevity.

Embodiment 200 shows a fuel tank 218 configured to deliver fuel to engine fuel injectors. A fuel pump (not shown) immersed in fuel tank 218 may be configured to pressurize fuel delivered to the injectors of engine 10, such as to injector 166. Fuel may be pumped into the fuel tank from an external source through a refueling door (not shown). Fuel tank 218 may hold a plurality of fuel blends, including fuel with a range of alcohol concentrations, such as various gasoline-ethanol blends, including E10, E85, gasoline, etc., and combinations thereof. A fuel level sensor 219 located in fuel tank 218 may provide an indication of the fuel level to controller 12. As depicted, fuel level sensor 219 may comprise a float connected to a variable resistor. Alternatively, other types of fuel level sensors may be used. One or more other sensors may be coupled to fuel tank 218 such as a fuel tank pressure transducer 220 for estimating a fuel tank pressure.

Vapors generated in fuel tank 218 may be routed to fuel vapor canister 22, via conduit 31, before being purged to engine intake 23. These may include, for example, diurnal and refueling fuel tank vapors. The canister may be filled with an appropriate adsorbent, such as activated charcoal, for temporarily trapping fuel vapors (including vaporized hydrocarbons) generated in the fuel tank. Then, during a later engine operation, when purge conditions are met, such as when the canister is saturated, the fuel vapors may be purged from the canister into the engine intake by opening canister purge valve 112 and canister vent valve 114.

Canister 22 includes a vent 27 for routing gases out of the canister 22 to the atmosphere when storing, or trapping, fuel vapors from fuel tank 218. Vent 27 may also allow fresh air to be drawn into fuel vapor canister 22 when purging stored fuel vapors to engine intake 23 via purge lines 90 or 92 (depending on boost level) and purge valve 112. While this example shows vent 27 communicating with fresh, unheated air, various modifications may also be used. Vent 27 may include a canister vent valve 114 to adjust a flow of air and vapors between canister 22 and the atmosphere. The vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister.

Fuel vapors released from canister 22, for example during a purging operation, may be directed into engine intake manifold 160 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc.

An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) may be obtained from MAP sensor 182 coupled to intake manifold 160, and communicated with controller 12. Alternatively, MAP may be inferred from alternate engine operating conditions, such as mass air flow (MAF), as measured by a MAF sensor coupled to the intake manifold.

Purge hydrocarbons may be directed to intake manifold 160 via either a boost path 92 or a vacuum path 90 based on engine operating conditions. Specifically, during conditions when turbocharger 120 is operated to provide a boosted aircharge to the intake manifold, the elevated pressure in the intake manifold causes one-way valve 94 in the vacuum path 90 to close while opening one-way valve 96 in the boost path 92. As a result, purge air is directed into the air intake passage 140, downstream of air filter 156 and upstream of charge air cooler 154 via the boost path 92. Herein, the purge air is introduced upstream of intake oxygen sensor 172. In some embodiments, as depicted, a venturi 98 may be positioned in the boost path such that the purge air is directed to the intake upon passing through the venturi and passage 99. This allows the flow of compressor bypass air to be advantageously harnessed for enhanced purge flow.

During conditions when engine 10 is operated without boost, elevated vacuum in the intake manifold causes one-way valve 94 in the vacuum path to open while closing one-way valve 96 in the boost path. As a result, purge air is directed into the intake manifold 160, downstream of throttle 158 via the vacuum path 90. Herein, the purge air is introduced downstream of intake oxygen sensor 172, directly into intake manifold 160, and therefore does not affect the output of oxygen sensor 172. In comparison, during conditions when engine 10 is operated with boost, the purge air is introduced upstream of intake oxygen sensor 172, and therefore does affect the output of oxygen sensor 172.

PCV hydrocarbons may also be directed to intake manifold 160 via either a boost side PCV hose 252 or a vacuum side PCV hose 254 based on engine operating conditions. Specifically, blow-by gases from engine cylinders 14 flow past the piston rings and enter crankcase 255. During conditions when turbocharger 120 is operated to provide a boosted aircharge to the intake manifold, the elevated pressure in the intake manifold causes one-way valve 256 in vacuum side PCV hose 254 to close. As a result, PCV air is directed into the air intake passage 140, downstream of air filter 156 and upstream of charge air cooler 154 via boost side PCV hose 252. The PCV flow may be directed to the intake passage upon passage through a boost side oil separator 260. The boost side oil separator may be integrated into the cam cover or may be an external component. Thus, during boosted conditions, the PCV gases are introduced upstream of intake oxygen sensor 172 therefore do affect the output of oxygen sensor 172.

In comparison, during conditions when engine 10 is operated without boost, elevated vacuum in the intake manifold causes one-way valve 256 in the vacuum side PCV hose 254 to open. As a result, PCV air is directed into the intake manifold 160, directly, downstream of throttle 158 via the vacuum side PCV hose 254. Herein, the PCV air is introduced downstream of intake oxygen sensor 172, and therefore does not affect the output of oxygen sensor 172.

Thus, due to the specific engine configuration, during engine idle conditions, when no boosted aircharge is provided, a reference point (herein also referred to as the zero point) of the intake air sensor may be learned without incurring interference from PCV and purge air hydrocarbons.

As such, the intake air oxygen sensor can be used to measure the amount of EGR in the intake aircharge as a function of the amount of change in oxygen content due to the addition of EGR as a diluent. Thus, as more EGR is introduced, a sensor output corresponding to a lower oxygen concentration may be output. However, to accurately determine this change in the amount of oxygen, it is important to know the oxygen reading of the sensor when no EGR is present. This reference point, also known as a zero point, needs to be calibrated and learned. However, the zero point reading has a large range of values that vary based on intake pressure, sensor age, and part-to-part variation, rendering accurate EGR measurement difficult.

FIG. 3 depicts this variation in the reading of the intake sensor. Specifically, map 300 depicts intake pressure along the x-axis and a pumping current output by the sensor, upon application of a reference voltage, along the y-axis. Plots 301a-d show a first set of intake oxygen sensor outputs at a first condition with no EGR. Plots 302a-d, 303a-d, and 304a-d show the sensor outputs at gradually increasing EGR levels, with 304a-d representing a nominal EGR percentage.

As can be seen by comparing the output at any given intake pressure (compare 301a to 301b, c, and d, and likewise for each set), a large amount of piece to piece variation occurs in the base oxygen measurement output by the sensor. As such, this piece-to-piece variation accounts for the largest amount of variation in the output of a given sensor. In addition, aging of the sensor adds to the variation. The variation makes learning of the zero point difficult, confounding the results of an EGR estimation.

As elaborated with reference to FIG. 4, the variation can be reduced by performing an idle adaptation for the sensor at each engine start. Specifically, at the first engine idle since every engine start, a zero point of the sensor may be learned and updated. This allows part-to-part variation and sensor aging to be learned and compensated for. By then using the most recently learned zero point as a reference for EGR estimation, EGR amounts can be determined more accurately and reliably.

Now turning to FIG. 4, an example routine 400 for learning a zero point of an intake oxygen sensor during selected engine idling conditions is shown. The method allows for a reference point of the sensor to be accurately learned without being confounded by PCV or purge hydrocarbons. In addition by learning the relationship between the intake pressure and the oxygen sensor output, oxygen concentrations and EGR flow can be measured accurately even if there is any inaccuracy in either sensor.

At 402, the routine includes estimating and/or measuring engine operating conditions. These may include, for example, engine speed, torque demand, barometric pressure, engine temperature, etc. Next it may be determined if selected engine idling conditions are present. As elaborated below at 404 and 406, the selected engine idling conditions may include a first engine idle since installation of one of a new intake oxygen sensor or new intake pressure sensor, or a first engine idle since an engine start.

Specifically, at 404, it may be determined if a new intake air oxygen (IAO2) sensor or a new intake pressure sensor was installed in the vehicle. For example, it may be determined if a new sensor was installed since the last engine shut-down and the current engine start. In one example, following installation of a new sensor, an indication that calibration of the new sensor is required may be received at the controller.

If a new oxygen sensor or pressure sensor was installed, then at 405, the routine includes resetting the previously learned adaptive values of the intake air oxygen sensor. That is, the previously learned zero point and pressure correction factors saved in a look-up table of the controller's memory (e.g., in the KAM) may be reset. Then, the table may be repopulated with data from the current zero point learning, and subsequent iterations of the routine.

If a new oxygen or pressure sensor was not installed, or after resetting the table if a new sensor was installed, the routine proceeds to 406 to confirm a first engine idle condition since the current engine start. If a first engine idle condition is not confirmed, at 407, the look-up table in the controller's memory may not be further updated and the current zero point readings may be used. As such, by re-learning the reference point each time a new sensor is installed, differences in oxygen sensor readings due to part-to-part variations can be better accounted for. By updating and re-learning the reference point on each engine start, differences in oxygen sensor readings due to sensor aging can be better accounted for.

Upon confirmation of a first engine idle condition since the current engine start, at 408, the routine includes learning a reference point for the intake oxygen sensor at a reference intake pressure during the selected engine idling condition. Specifically, the controller may learn the oxygen sensor output at the first engine idle condition and may also note the reference intake pressure at which the oxygen sensor output was learned. The controller may update the look-up table saved in the controller's KAM with the oxygen sensor output learned at the given pressure. In one example, the reference intake pressure is a throttle inlet pressure estimated by a TIP sensor coupled to the intake manifold at a location similar to the oxygen sensor (e.g., downstream of the charge air cooler and upstream of the intake throttle). In another example, the reference intake pressure is a manifold pressure estimated by a MAP sensor coupled to the intake manifold at a location similar to the oxygen sensor.

As such, learning the reference point includes learning a relationship between a first output of the intake oxygen sensor at a first intake pressure during the first engine idle since start, and then using the learned relationship, the idle reference oxygen (iao2_ref) at the reference pressure (iao2_ref_press) is calculated. It is calculated by determining a correction factor (iao2_press_corr) as:

$$iao2\_press\_corr = a0 + a1*(iao2\_ref\_press - iao2\_press) + a2*(iao2\_ref\_press - iao2\_press)^2$$

The idle reference oxygen is then calculated as:

$$iao2\_ref = iao2\_o2 * iao2\_press\_corr$$

By performing this learning during idle conditions, various advantages are achieved. First, any error caused due to noise factors from purge or PCV hydrocarbons is reduced. Second, since pressure changes at the intake oxygen sensor location are minimal during idle conditions, changes in the oxygen sensor output due to the pressure effect (as described at FIG. 3) are also minimized. Overall, a more accurate zero point learning can be achieved.

At 410, the intake oxygen sensor output is corrected for humidity. As elaborated with reference to FIG. 8, the output of the intake oxygen sensor estimated at the reference pressure is corrected with a correction factor based on ambient humidity. This may include correcting for no humidity (that is, zero % humidity or dry conditions) wherein the output of the oxygen sensor is corrected by removing all the contribution of humidity. Alternatively, this may include correcting to a known standard or reference humidity level. For example, the oxygen sensor output may be corrected to a reference 1.2% of humidity.

At 412, it may be determined if the idle adaptation is complete. As such, the intake oxygen sensor readings at the given reference intake pressure may be monitored for a duration of the first engine idle since the engine start and the look-up table may be continue to be populated over the duration with readings from the intake oxygen sensor. In one example, when the idle adaptation is initiated at 408, a timer may be started and at 412, it may be determined if a threshold duration has elapsed on the timer. In one example, the idle adaptation may be complete if 15 seconds has elapsed.

Upon confirming that the idle adaptation has been completed, at 414, the routine includes calculating a pressure correction factor. The pressure correction factor is a factor that compensates for the effect of intake pressure on the output of the intake oxygen sensor. The pressure correction factor is determined by taking the ratio of the measured oxygen and the reference oxygen reading (iao2_ref), the reference oxygen reading being the reference oxygen reading of the intake oxygen sensor at the reference pressure. Nominally, the reference pressure may be 100 kPa. The pressure correction adaptation may be performed by calculating a pressure correction factor based on the output of the intake oxygen sensor (iao2_o2) relative to the zero point (iao2_ref) of the sensor (that is, iao2_o2/iao2_ref). In addition, a delta pressure may also be determined based on the reference pressure, wherein the delta pressure is calculated as TIP—iao2_ref_press. Herein, TIP may be the same as boost pressure. The delta pressure is calculated as the difference between the measured boost pressure TIP and the reference pressure. The delta pressure from the reference pressure provides information about the change in oxygen reading from iao2_ref versus the change in the pressure from the reference pressure. The reference pressure corresponds with the pressure at which iao2_ref was determined.

At 418, the routine includes calculating and learning the zero point of the intake oxygen sensor. This may include, for example, performing a recursive least squares adaptation for pressure correction. The correction may be denoted as:

$$Iao2\_press\_corr\_new = a2*dp\_corr^2 + a1*dp\_corr + a0,$$

wherein a0, a1, and a2 are pressure correction coefficients, and dp_corr is the delta pressure correction (that is, delta pressure from reference pressure).

Figure 9:
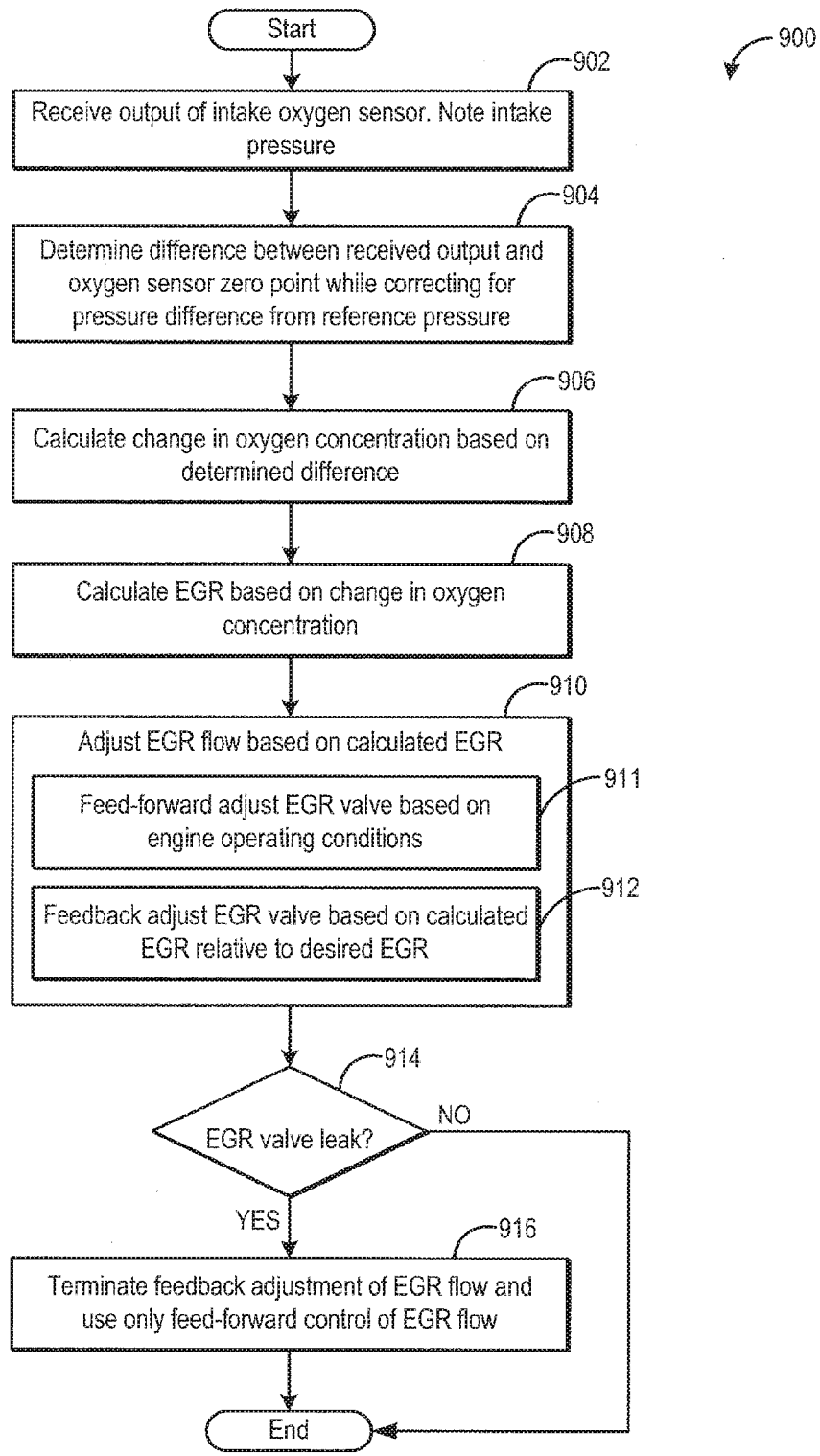
FIG. 9 depicts a flowchart for EGR control using the learned intake oxygen zero point.

Once the zero point is learned, an EGR flow to the engine can be adjusted based on an output of the intake oxygen sensor during EGR conditions, as elaborated at FIG. 9. Therein, an EGR flow to the engine is adjusted based on an intake oxygen concentration estimated by the intake oxygen sensor relative to the learned reference point, and further based on a change in intake pressure relative to the reference intake pressure (where the reference point was learned).

At 420, the routine includes diagnosing an EGR valve based on the zero point estimated during the idle adaptation relative to a zero point estimated during selected engine non-fueling conditions, such as during a deceleration fuel shut off (DFSO) adaptation. An example DFSO adaptation is described in FIG. 5. As such, the zero point learned during the idle adaptation may be a first learned reference point, while the zero point learned during the DFSO adaptation may be a second learned reference point (both learned at a given reference intake pressure). As elaborated at FIG. 6, the controller may indicate EGR valve degradation based on a difference between the first learned reference point and the second learned reference point being larger than a threshold amount.

As such, while the idle adaptation performed during idle conditions removes the effect of purge and PCV hydrocarbons on the intake oxygen sensor output, as well as the effect of pressure variations, the idle adaptation is susceptible to EGR leakage. Thus, if the EGR valve is leaking, assuming there is no EGR backflow, EGR may flow over the intake oxygen sensor even during the idle conditions. As a result, the output from the oxygen sensor output may be lower than the actual value. In comparison, an adaptation performed during DFSO is insensitive to the effect of a leaking EGR valve. This is because even if the valve were leaking, the leaking "EGR" would be air since no fuel is being injected during these conditions. As a result, the exhaust leak does not affect the output of the oxygen sensor. Thus, by comparing the zero point learned during the idle adaptation with the zero point learned during the DFSO adaptation, EGR valve leakage can be identified.

An example idle adaptation is shown with reference to FIG. 7. Map 700 depicts an idle adaptation timer at plot 702, and a change in oxygen concentration sensed by the intake oxygen sensor at plot 704.

Prior to t1, idle adaptation conditions may not be present. At t1, a first engine idle since an engine start may be confirmed and an idle adaptation timer may be started. Plot 704 (solid line) shows a zero point of the intake oxygen sensor relative to an expected value 708. Plot 706 (dashed line) shows the intake sensor output. As such, prior to the idle adaptation, the deviation of the estimated zero point from the expected zero point is larger. Then, during the adaptation, based on the sensor reading (plot 706), the zero point is corrected and the learned zero point gradually merges with the expected value. At t2, the idle adaptation is completed and the learned zero point is used for accurate EGR control.

In one example, a method for an engine comprises: learning a relationship between a first intake oxygen sensor output estimated at a first intake pressure during a first engine idle since engine start, and adjusting EGR flow to the engine at a second intake pressure based on a second intake oxygen sensor output estimated at the second intake pressure and the learned relationship. The adjusting includes calculating a pressure correction factor based on a difference between the first intake pressure and the second intake pressure, calculating a humidity correction factor based on a difference between ambient humidity at the second intake pressure and a reference humidity, modifying the second intake oxygen sensor output based on each of the calculated pressure correction factor, humidity correction factor, and the learned relationship, and adjusting a position of an EGR valve based on the modified second intake oxygen sensor output. The EGR valve may be coupled in a low pressure EGR passage and wherein the learning is performed at a first engine idle following each engine restart. Herein, each of the first and second intake oxygen sensor output is generated by an intake oxygen sensor coupled upstream of an intake throttle and downstream of a charge air cooler, and each of the first and second intake pressure is estimated by an intake pressure sensor coupled upstream of the intake throttle and downstream of the charge air cooler. The learning is performed at a first engine idle following installation of one or more of the intake oxygen sensor and the intake pressure sensor in the engine, so as to correct for part-to-part variations as well as sensor aging. In addition, degradation of the EGR valve can be indicated based on the first intake oxygen sensor output estimated at the first intake pressure during the first engine idle since engine start relative to a second intake oxygen sensor output estimated at the first intake pressure during an engine deceleration fuel shut-off condition.

Now turning to FIG. 5, an example routine 500 for learning a zero point of an intake oxygen sensor during selected engine non-fueling conditions is shown. The method allows for a reference point of the sensor to be accurately learned without being confounded by EGR valve leakage.

At 502, as at 402, the routine includes estimating and/or measuring engine operating conditions. These may include, for example, engine speed, torque demand, barometric pressure, engine temperature, etc. Next it may be determined if selected engine non-fueling conditions are present. As elaborated below, the selected engine non-fueling conditions may include a deceleration fuel shut-off condition. The routine may be repeated at the first DFSO event after every engine start and/or the first DFSO event after a new oxygen or pressure sensor is installed.

At 504, it may be determined if a new intake air oxygen (IAO2) sensor or a new intake pressure sensor was installed in the vehicle. For example, it may be determined if a new sensor was installed since the last engine shut-down and the current engine start. In one example, following installation of a new sensor, an indication that calibration of the new sensor is required may be received at the controller.

If a new oxygen sensor or pressure sensor was installed, then at 505, the routine includes resetting the previously learned adaptive values of the intake air oxygen sensor. That is, the previously learned zero point and pressure correction factors saved in a look-up table of the controller's memory (e.g., in the KAM) may be reset. Then, the table may be repopulated with data from the current zero point learning, and subsequent iterations of the DFSO adaptation routine.

If a new oxygen or pressure sensor was not installed, or after resetting the table if a new sensor was installed, the routine proceeds to 506 to confirm if engine non-fueling conditions are present. Specifically, a deceleration fuel shut off (DFSO) condition may be confirmed. If a DFSO condition is not confirmed, at 507, the look-up table in the controller's memory may not be further updated and the current zero point readings may be used. As such, by re-learning the reference point each time a new sensor is installed, differences in oxygen sensor readings due to part-to-part variations can be better accounted for. By updating and re-learning the reference point on each engine start, differences in oxygen sensor readings due to sensor aging can be better accounted for.

Upon confirmation of the DFSO condition, at 508, the routine includes learning a reference point for the intake oxygen sensor at a reference intake pressure during the non-fueling condition. Specifically, the controller may learn the oxygen sensor output at the first engine idle condition and may also note the reference intake pressure at which the oxygen sensor output was learned. The controller may update the look-up table saved in the controller's KAM with the oxygen sensor output learned at the given pressure. In one example, the reference intake pressure is a throttle inlet pressure estimated by a TIP sensor coupled to the intake manifold at a location similar to the oxygen sensor (e.g., downstream of the charge air cooler and upstream of the intake throttle). In another example, the reference intake pressure is a manifold pressure estimated by a MAP sensor coupled to the intake manifold at a location similar to the oxygen sensor.

As such, learning the reference point includes learning a relationship between a first output of the intake oxygen sensor at a first intake pressure during the first DFSO event since engine start, and then using the learned relationship to determine the zero point. The learned relationship is used to determine the zero point by calculating the oxygen reading at the reference pressure, by substituting the delta pressure from the reference pressure. By performing this learning during DFSO conditions, various advantages are achieved. First, any error caused due to noise factors from purge or PCV hydrocarbons is reduced. Second, errors due to EGR valve leakage are reduced. This is because during the non-fueling conditions, any leaked "EGR" is the same as the intake air. Overall, a more accurate zero point learning can be achieved.

At 510, the intake oxygen sensor output is corrected for humidity. As elaborated with reference to FIG. 8, the output of the intake oxygen sensor estimated at the reference pressure is corrected with a correction factor based on ambient humidity. As such, this may include correcting for no humidity (that is, zero % humidity or dry conditions) wherein the output of the oxygen sensor is corrected by removing all the contribution of humidity. Alternatively, this may include correcting to a known standard or reference humidity level. For example, the oxygen sensor output may be corrected to a reference 1.2% of humidity.

At 512, it may be determined if the DFSO adaptation is complete. As such, the intake oxygen sensor readings at the given reference intake pressure may be monitored for a duration of the DFSO and the look-up table may be continue to be populated over the duration with readings from the intake oxygen sensor. In one example, when the DFSO is initiated at 508, a timer may be started and at 512, it may be determined if a threshold duration has elapsed on the timer. In one example, the DFSO adaptation may be complete if 4 seconds has elapsed.

Upon confirming that the DFSO adaptation has been completed, at 514, the routine includes calculating a pressure correction factor. The pressure correction factor is a factor that compensates for the effect of intake pressure on the output of the intake oxygen sensor. The pressure correction adaptation may be performed by calculating a pressure correction factor based on the output of the intake oxygen sensor (iao2_o2) relative to the zero point (iao2_ref) of the sensor (that is, iao2_o2/iao2_ref). In addition, a delta pressure may also be determined based on the reference pressure, wherein the delta pressure is calculated as TIP—iao2_ref_press. Herein, TIP may be the same as boost pressure. At idle condition, the reference intake oxygen and preference intake pressure are determined. The pressure correction factor at a given pressure condition is calculated as the ratio of intake oxygen sensor reading and the reference oxygen concentration (that is, iao2_o2/iao2_ref). This corrected factor is learned as a relation between the delta pressure and the reference pressure. By doing this, the pressure input into the relationship is normalized to the reference pressure.

At 518, the routine includes calculating and learning the zero point of the intake oxygen sensor. This may include, for example, performing a recursive least squares adaptation for pressure correction. The correction may be denoted as:

$$Iao2\_press\_corr\_new = a2 * dp\_corr^2 + a1 * dp\_corr + a0,$$

wherein a0, a1, and a2 are pressure correction coefficients, and dp_corr is the delta pressure correction.

Once the zero point is learned, an EGR flow to the engine can be adjusted based on an output of the intake oxygen sensor during EGR conditions, as elaborated at FIG. 9. Therein, an EGR flow to the engine is adjusted based on an intake oxygen concentration estimated by the intake oxygen sensor relative to the learned reference point, and further based on a change in intake pressure relative to the reference point At 520, the routine includes diagnosing an EGR valve based on the zero point estimated during the DFSO adaptation relative to a zero point estimated during an idle adaptation. An example idle adaptation is described in FIG. 4. As such, the zero point learned during the idle adaptation may be a first learned reference point, while the zero point learned during the DFSO adaptation may be a second learned reference point (both learned at a given reference intake pressure). As elaborated at FIG. 6, the controller may indicate EGR valve degradation based on a difference between the first learned reference point and the second learned reference point being larger than a threshold amount.

Turning now to FIG. 8. An example routine 800 is shown for correcting a nominal output of an intake oxygen sensor during zero point learning based on an ambient humidity estimate. The routine allows for oxygen displaced by the humidity to be accounted for.

At 802, the routine includes confirming that zero point learning is enabled. Specifically, it may be confirmed that either idle adaptation or DFSO adaptation of the intake oxygen sensor is being performed, as previously discussed with reference to FIGS. 4-5.

Upon confirmation, at 804, the routine includes learning a reference point for the intake oxygen sensor at a reference intake pressure. This includes learning a nominal amount of oxygen based on an output of the intake oxygen sensor at the reference intake pressure during selected engine idling conditions or selected engine non-fueling conditions. As such, the reference intake pressure is one of a throttle inlet pressure and an intake manifold pressure. The selected engine idling conditions include a first engine idle since an engine start, a first engine idle since installation of the intake oxygen sensor or installation of an intake pressure sensor configured to estimate the reference intake pressure. The selected non-fueling conditions include a deceleration fuel shut-off condition.

At 806, an intake oxygen concentration is estimated based on the sensor output. At 808, ambient humidity is estimated, for example, via an intake manifold humidity sensor (such as sensor 173 of FIG. 1). At 810, the routine includes calculating an amount of oxygen displaced by the estimated ambient humidity. As such, the change in oxygen concentration due to humidity may be defined as per the equation:

$$O_2 \text{MeasuredConcentration} = 21\%/1 + \text{volume \% gwater},$$

wherein $O_2$MeasuredConcentration is the measured oxygen concentration with volume % water (fraction) amount of water in air (that is, humidity).

At 812, it may be determined if the nominal oxygen concentration is to be corrected based on the ambient humidity to reflect dry conditions or standard humidity conditions. In one example, during a first condition (at 814), the reference point may be calibrated to dry conditions (zero humidity) where the effect of all humidity is removed from the oxygen sensor output. In another example, during a second condition (at 816), the reference point may be calibrated to standard humidity conditions where the effect of humidity on the oxygen sensor output is corrected to pre-defined humidity conditions. An example of a standard humidity condition may be a humidity of 8 g/kg or 1.28%.

If dry condition calibration is selected, then at 814, the routine includes correcting the learned reference point by adding the calculated amount of oxygen to the learned nominal amount of oxygen. This corrects the reference point to dry air conditions (that is, zero humidity) and the effect of all humidity on the oxygen sensor output is removed. The routine then moves to 820 to update the zero point value in the adaptive values table. Specifically, the corrected zero point is learned with relation to the reference intake pressure and stored in the controller's memory.

If the standard humidity condition calibration is selected, then at 816, the routine includes adding the calculated amount of oxygen to the learned nominal amount of oxygen, as at 814. Then, at 818, after correcting the reference point to dry air, the routine includes further calibrating the reference point to a standard humidity level. In one example, the standard humidity level is 1.2% humidity. The routine then proceeds to 520 to update the zero point value in the adaptive values table.

As such, the humidity corrected zero point is then used to estimate EGR and adjust EGR flow. For example, the controller may subsequently (that is, after learning and during engine non-idling conditions) adjust EGR flow to the engine based on an intake oxygen concentration estimated by the sensor relative to the corrected reference point, and further based on a change in intake pressure from the reference intake pressure.

In one example, the intake oxygen sensor reading may correspond to 19.5% oxygen and the estimated ambient humidity read by the humidity sensor may be 30 grams/KG of air. The humidity reading may be converted to molar percent of water as per the calculation $100*(30/1000)*29/18=4.83\%$, where 29 is the molecular weight of air and 18 is the molecular weight of water. The 4.83% water displaces an amount of oxygen corresponding to $4.83*21/100=1.01\%$ oxygen, where 21 is the atmospheric dry oxygen reading. The corrected dry air reading of the intake oxygen sensor is then calculated as 19.5% (intake air sensor reading)+1.01% (humidity correction)=20.5%.

Alternatively, the dry air oxygen reading learned above is further adjusted to a standard humidity level oxygen reading. Therein, the humidity sensor information is used to calculate the dry air oxygen reading which is then adjusted with the amount of oxygen that would be displaceable by a calibratable amount of humidity. With reference to the above example, if the calibratable amount of humidity is 10 g/KG of air, the displaced oxygen corresponding to this amount of humidity would be 0.34%. The nominal intake oxygen sensor reading would then be adjusted to 20.5% (dry air reading)−0.34% (displaced oxygen for the calibrated humidity level)=20.16%.

As another example, an engine system may comprise an engine including an intake manifold, a turbocharger including an exhaust turbine and an intake compressor, a charge air cooler coupled downstream of the compressor, and an intake oxygen sensor coupled to the intake manifold downstream of the charge air cooler and upstream of an intake throttle. Alternatively, the intake oxygen sensor can be located upstream of the CAC if the total LP-EGR concentration going to the engine is well mixed. The engine system may further include a pressure sensor coupled to the intake manifold downstream of the charge air cooler and upstream of the intake throttle, as well as a humidity sensor coupled to the intake manifold downstream of the charge air cooler and upstream of an intake throttle. An EGR system may be included in the engine including an EGR passage and EGR valve for recirculating exhaust residuals from downstream of the turbine to upstream of the compressor. An engine controller may be configured with computer readable instructions for: during a first engine idle since an engine start, learning an oxygen sensor output and a humidity sensor output at a reference intake pressure and adjusting the oxygen sensor output based on the humidity sensor output. Then, during subsequent engine non-idle conditions, the controller may be configured to adjust an opening of the EGR valve based on an intake oxygen concentration estimated by the intake oxygen sensor relative to the reference oxygen sensor output, and further based on an intake pressure relative to the reference intake pressure. Herein, adjusting the oxygen sensor output based on the humidity sensor output includes, during a first condition at idle, estimating a first amount of oxygen displaced by total humidity based on the humidity sensor output and adjusting (e.g., increasing) the reference oxygen sensor output for either dry or standard humidity conditions. In comparison, during a second condition, such as non-idle conditions, the oxygen sensor can reliably predict the oxygen concentration and adjust the EGR valve accordingly having been previously corrected for part to part variations, change over time and variable humidity levels.

In this way, a controller may correct a first, nominal output of an intake oxygen sensor, learned during selected engine idling conditions at a reference intake pressure, based on an measured ambient humidity. The selected engine idling conditions include one of a first engine idle from engine start, a first engine idle following installation of the intake oxygen sensor, and a first engine idle following installation of an intake pressure sensor. The controller may then adjust EGR flow to the engine based on a second output of the sensor, estimated at a second intake pressure, relative to the corrected first output. The EGR flow may be further adjusted based on the second intake pressure relative to the reference intake pressure.

The correcting performed by the controller may include calculating an amount of oxygen displaced by the estimated ambient humidity, and increasing the first output to include the amount of displaced oxygen, wherein the increased first output is indicative of a dry air oxygen content. In this way, the effect of all humidity is removed from the oxygen sensor output. The correcting may alternatively further include adjusting the increased first output based on an amount of oxygen displaceable by a calibrated humidity level, the adjusted output indicative of a calibrated humidity air oxygen content. In this way, the oxygen sensor output is calibrated to a standard humidity level.

The controller may adjust the EGR flow by estimating a delivered EGR flow based on a difference between the second output and the corrected first output, and adjusting a position of an EGR valve based on a difference between the delivered EGR flow and a target EGR flow, wherein the target EGR flow based on engine speed-load conditions.

Figure 6:
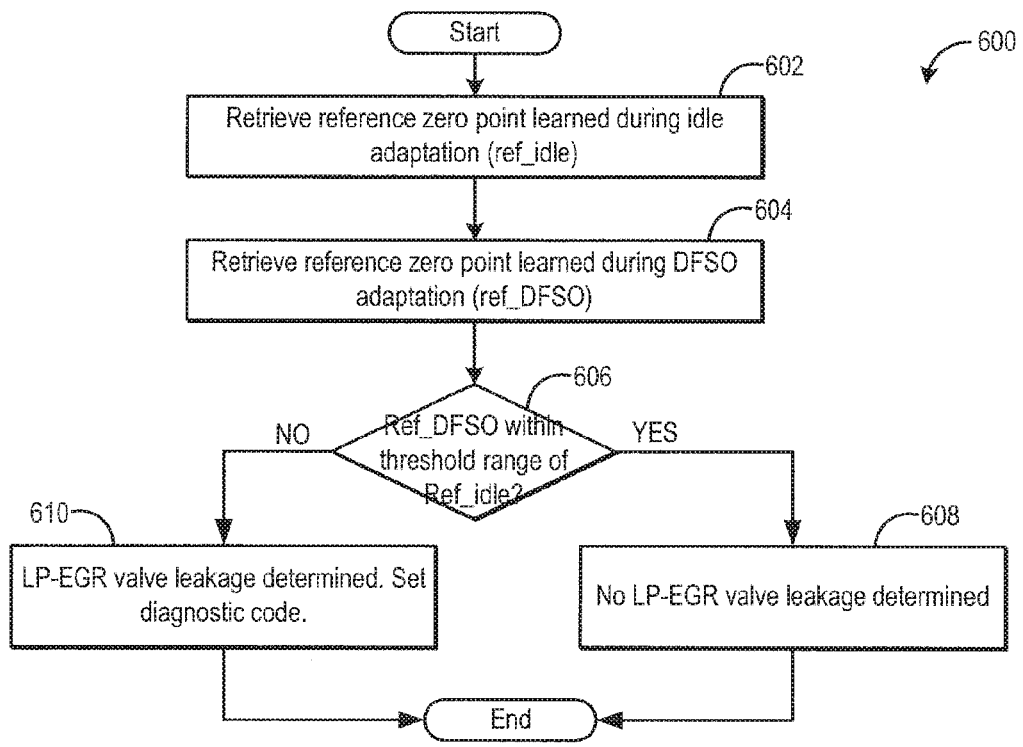
FIG. 6 depicts a flowchart for identifying degradation of an EGR valve based on the zero point estimated using idle adaptation and the zero point estimated using DFSO adaptation.

Now turning to FIG. 6, an example routine 600 for diagnosing an EGR valve coupled to a low pressure EGR system based on intake oxygen sensor reference points learned during an idle adaptation and a DFSO adaptation is shown. The method allows an EGR valve leak to be identified and compensated for.

At 602, the routine includes retrieving a first reference point learned during an idle adaptation (ref_idle) such as the idle adaptation of FIG. 4. At 604, the routine includes retrieving a second reference point learned during a DFSO adaptation (ref_DFSO) such as the DFSO adaptation of FIG. 5. At 606, the two reference points may be compared and it may be determined if there are any discrepancies between them. Specifically, it may be determined if the first reference point is within a threshold range of the second reference point, or if they differ by more than a threshold amount. The controller may then indicate EGR valve leakage based on the first reference point of the intake oxygen sensor learned during engine idling conditions relative to the second reference point of the oxygen sensor learned during engine non-fueling conditions. Specifically, at 610, EGR valve leakage is indicated based on a difference between the first reference point and the second reference point being larger than a threshold. The controller may indicate the EGR valve degradation by setting a diagnostic code. In comparison, at 608, no EGR valve leakage is indicated when the difference is smaller than the threshold.

As discussed at FIG. 9, based on the indication of EGR valve leakage, EGR control responsive to an output of the intake oxygen sensor may be adjusted. Specifically, in response to the indication of no EGR valve leakage, the EGR valve may be feed-forward adjusted based on engine speed-load conditions and feedback adjusted based on an output of the intake manifold sensor relative to one of the first and second reference point. In comparison, in response to an indication of EGR valve leakage, the controller may continue feed-forward adjusting the EGR valve based on engine speed-load conditions but may terminate feedback adjusting of the EGR valve based on the output of the intake manifold sensor relative to one of the first and second reference point.

As used herein, indication EGR valve degradation includes indicating leakage of an EGR valve coupled to a low pressure EGR passage configured to recirculate exhaust residuals from an exhaust manifold, downstream of a turbine to an intake manifold, upstream of a compressor. The intake oxygen sensor may be coupled to the engine intake manifold, upstream of an intake throttle and either upstream or downstream of a charge air cooler, the cooler coupled downstream of the compressor. Herein, each of the first and second reference points are learned at a reference intake pressure, the reference intake pressure estimated by an intake pressure sensor coupled to the engine intake manifold, upstream of the intake throttle and downstream of the charge air cooler.

Now turning to FIG. 9, routine 900 depicts an example method for performing EGR control using the output of an intake manifold oxygen sensor relative to a zero point of the sensor learned during an idle adaptation and/or a DFSO adaptation. The method further adjusts the feed-forward feedback components of EGR control based on any indication of EGR valve degradation.

At 902, the output of an intake manifold oxygen sensor is received. An intake pressure at which the output was received is also noted since the output is affected by intake pressure. At 904, a pressure correction of the output is performed based on the intake pressure at which the sensor output was taken relative to a reference intake pressure. Also at 904, a difference between the pressure-corrected oxygen sensor output and the zero point of the oxygen sensor is learned. As such, as an amount of EGR flow increases, exhaust dilution of intake air increases, reducing the amount of oxygen available in the intake air, and thereby reducing the output of the intake sensor. The EGR dilution may be reflected as a drop in oxygen concentration sensed by the intake oxygen sensor.

Thus at 906, a change in oxygen concentration may be determined based on the determined difference between the oxygen sensor output relative to the zero point. At 908, an amount of EGR dilution of intake air is determined based on the change in oxygen concentration. At 910, an EGR flow is controlled based on the EGR dilution determined and the desired EGR. As used herein, the EGR flow may be a low pressure EGR flow along an EGR passage from an exhaust manifold, downstream of an exhaust turbine, to an intake manifold, upstream of an intake compressor, via an EGR valve. In addition, the EGR may be provided at a fixed rate or variable rate relative to intake air flow based on engine operating conditions. For example, at all engine speed-load conditions from a medium load down to a minimum load, low pressure EGR may be delivered at a fixed rate relative to the intake air flow (that is, at a fixed EGR percentage). In comparison, at engine speed-load conditions above a medium load, low pressure EGR may be delivered at a variable rate relative to the intake air flow (that is, at a variable EGR percentage).

Controlling the EGR flow includes, at 911, feed-forward adjusting the EGR valve based on engine operating conditions, such as speed-load conditions. For example, at higher engine speed-load conditions, an opening of the EGR valve may be increased while at lower engine speed-load conditions, the EGR valve opening may be decreased. In addition, at 912, the controlling includes feedback adjusting the EGR valve based on the calculated EGR flow relative to a desired EGR flow. For example, if the actual flow estimated by the intake oxygen sensor exceeds the desired or expected flow, the EGR valve opening may be decreased. As another example, if the actual flow estimated by the intake oxygen sensor is below the desired or expected flow, the EGR valve opening may be increased.

At 914, it may be determined if there is an indication of EGR valve leakage. As elaborated at FIG. 6, EGR valve leakage may be identified based on deviations between an oxygen sensor zero point learned using the idle adaptation and a zero point learned using the DFSO adaptation. If no EGR valve leakage is identified, the routine may end. Else at 816, in response to the indication of EGR valve leakage, the controller may terminate the feedback adjustment of the EGR valve based on the output of the intake oxygen sensor and temporarily shift to using only feed-forward control of the EGR valve. In alternate embodiments, in response to the indication of EGR valve leakage, EGR may be transiently disabled or a diagnostic flag may be set.

In other words, in response to an indication of no EGR valve leakage, the EGR valve is feed-forward adjusted based on engine speed-load conditions and feedback adjusted based on an output of the intake manifold sensor relative to at least one of the first and second reference points learned during idle and DFSO adaptations, respectively. In comparison, in response to an indication of EGR valve leakage, the EGR valve is only feed-forward adjusted based on engine speed-load conditions while feedback adjusting of the EGR valve based on the output of the intake manifold sensor relative to at least one of the first and second reference points is terminated. This allows EGR control to be improved when EGR valve leakage is known.

In one example, an engine system comprises an engine including an intake manifold, a turbocharger including an exhaust turbine and an intake compressor, a charge air cooler coupled downstream of the compressor, and an intake oxygen sensor coupled to the intake manifold downstream of the charge air cooler and upstream of an intake throttle. A pressure sensor may be coupled to the intake manifold downstream of the charge air cooler and upstream of the intake throttle. The engine system may further comprise an EGR system including an EGR passage and EGR valve for recirculating exhaust residuals from downstream of the turbine to upstream of the compressor. A controller of the engine system may be configured with computer readable instructions for: during a first engine idle since an engine start, learning a reference point for the oxygen sensor at a reference intake pressure; and adjust an opening of the EGR valve based on an intake oxygen concentration estimated by the sensor relative to the learned reference point, and further based on an intake pressure relative to the reference intake pressure. The controller may additionally, or optionally, during an engine deceleration fuel shut-off condition, learn a reference point for the oxygen sensor at the reference intake pressure; and adjust an opening of the EGR valve based on an intake oxygen concentration estimated by the sensor relative to the learned reference point, and further based on an intake pressure relative to the reference intake pressure. The engine system may further comprise a humidity sensor for estimating an ambient humidity, the controller then further adjusting the opening of the EGR valve based on an ambient humidity relative to a reference humidity. The controller may further determine degradation of the EGR valve based on differences between the reference points learned during the idle condition relative to the DFSO condition.

In this way, a relationship between an intake oxygen sensor and an intake pressure sensor can be learned at varying humidity conditions, and an EGR flow can be learned based on a change in the output of the oxygen sensor, independent of the accuracy of either the oxygen sensor or the pressure sensor. By adjusting the output of an intake oxygen sensor based on an ambient humidity estimated by an intake humidity sensor, the displacement of intake oxygen by humidity can be accurately estimated and accounted for, improving the reliability of the oxygen sensor's zero point reading. By performing the learning during idling conditions, noise factors due to ingestion of PCV and purge HCs, intake pressure variations, sensor aging, as well as part-to-part variations is reduced. By also performing the learning during engine non-fueling conditions, such as a DFSO, noise factors due to EGR valve leakage are reduced. By increasing the accuracy of the intake oxygen sensor's zero point reading, EGR can be estimated more reliably, improving EGR control.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-3, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine with a turbocharger, comprising:
cooling boosted intake charge with a charge air cooler;
estimating an ambient humidity via an intake humidity sensor while learning a reference point for an intake oxygen sensor at a reference intake pressure, the reference point corresponding to an oxygen sensor reading when no EGR is present;
combusting cooled intake charge, including EGR, with directly injected fuel in the engine;
adjusting valve timing of one of an intake and exhaust valve of the engine;
passing turbocharger compressor bypass flow through a venturi to generate a draw on an accessory passage;
correcting the learned reference point based on the estimated ambient humidity; and
adjusting an opening of an EGR valve based on the correcting.

2. The method of claim 1, wherein the accessory passage is a purge passage, and wherein each of the humidity sensor and the oxygen sensor are positioned upstream of an intake throttle and downstream of the charge air cooler in an engine intake manifold.

3. The method of claim 1, wherein learning the reference point includes learning a nominal amount of oxygen based on an output of the intake oxygen sensor at the reference intake pressure during selected engine idling conditions or selected engine non-fueling conditions.

4. The method of claim 3, wherein the selected engine idling conditions include a first engine idle since an engine start.

5. The method of claim 3, wherein the selected engine idling conditions include a first engine idle since installation of the intake oxygen sensor or installation of an intake pressure sensor configured to estimate the reference intake pressure.

6. The method of claim 3, wherein the selected engine non-fueling conditions include a deceleration fuel shut-off condition.

7. The method of claim 3, wherein correcting the learned reference point based on the estimated ambient humidity includes calculating an amount of oxygen displaced by the estimated ambient humidity, and adding the calculated amount of oxygen to the learned nominal amount of oxygen to correct the reference point to dry air.

8. The method of claim 7, wherein the correcting further includes, after correcting the reference point to dry air, calibrating the reference point to a standard humidity level.

9. The method of claim 8, wherein the reference intake pressure is one of a throttle inlet pressure and an intake manifold pressure.

10. The method of claim 8, further comprising, adjusting EGR flow to the engine based on an intake oxygen concentration estimated by the intake oxygen sensor relative to the corrected reference point, and further based on a change in intake pressure from the reference intake pressure.

11. The method of claim 10, wherein adjusting EGR flow to the engine includes adjusting low-pressure EGR flow along an EGR passage from an exhaust manifold, downstream of an exhaust turbine, to an intake manifold, upstream of an intake compressor, via the EGR valve.

12. The method of claim 11, wherein each of the intake oxygen sensor and humidity sensor are positioned downstream of an output of the EGR passage.

13. A method for an engine, comprising:
correcting a first, nominal output of an intake oxygen sensor, learned during selected engine idling conditions at a reference intake pressure, based on an ambient humidity estimated by an intake humidity sensor; and
adjusting EGR flow to the engine via adjustments to an EGR valve opening based on a second output of the oxygen sensor, estimated at a second intake pressure, relative to the corrected first output; and
bypassing compressed air around a turbocharger compressor to drawn purge flow into an engine intake system to the engine.

14. The method of claim 13, wherein the EGR flow is further adjusted based on the second intake pressure relative to the reference intake pressure, and wherein the selected engine idling conditions include one of a first engine idle from engine start, a first engine idle following installation of the intake oxygen sensor, and a first engine idle following installation of an intake pressure sensor.

15. The method of claim 13, wherein the correcting includes,
calculating an amount of oxygen displaced by the estimated ambient humidity; and
increasing the first output to include the amount of displaced oxygen, wherein the increased first output is indicative of a dry air oxygen content.

16. The method of claim 15, wherein the correcting further includes,
adjusting the increased first output based on an amount of oxygen displaceable by a calibrated humidity level, the adjusted output indicative of a calibrated humidity air oxygen content.

17. The method of claim 16, wherein adjusting the EGR flow includes estimating a delivered EGR flow based on a difference between the second output and the corrected first output, and adjusting a position of an EGR valve based on a difference between the delivered EGR flow and a target EGR flow, the target EGR flow based on engine speed-load conditions.

18. An engine system, comprising:
an engine including an intake manifold;
a turbocharger including an exhaust turbine and an intake compressor;
a charge air cooler coupled downstream of the compressor;
a direct fuel injector coupled to an engine cylinder;
a variable cam timing system coupled to engine intake exhaust valves;
an intake oxygen sensor coupled to the intake manifold downstream of the charge air cooler and upstream of an intake throttle;
a pressure sensor coupled to the intake manifold downstream of the charge air cooler and upstream of the intake throttle;
a humidity sensor coupled to the intake manifold downstream of the charge air cooler and upstream of the intake throttle;
an EGR system including an EGR passage and EGR valve for recirculating exhaust residuals from downstream of the turbine to upstream of the compressor; and
a controller with computer readable instructions for:
during a first engine idle since an engine start,
learning an oxygen sensor output and a humidity sensor output at a reference intake pressure; and
adjusting the oxygen sensor output based on the humidity sensor output; and
during subsequent engine non-idle conditions,
adjusting an opening of the EGR valve based on an intake oxygen concentration estimated by the intake oxygen sensor relative to the increased oxygen sensor output, and further based on an intake pressure relative to the reference intake pressure.

19. The system of claim 18, wherein increasing the oxygen sensor output based on the humidity sensor output includes,
during a first condition, estimating a first amount of oxygen displaced by total humidity based on the humidity sensor output and increasing the oxygen sensor output with the first amount of oxygen; and
during a second condition, estimating a second amount of oxygen displaced by a calibrated humidity based on the humidity sensor output, and decreasing the oxygen sensor output with the second amount of oxygen.

20. The system of claim 19, wherein the first condition includes ambient humidity higher than a threshold humidity level, and wherein the second condition includes ambient humidity lower than the threshold humidity level.

* * * * *